United States Patent
Winkelmann et al.

(10) Patent No.: US 7,670,256 B2
(45) Date of Patent: Mar. 2, 2010

(54) AUTOMOTIVE DRIVE TRAIN AND METHOD FOR REDUCING CHATTER IN THE SAME

(75) Inventors: Stefan Winkelmann, Buehl (DE); Boris Serebrennikov, Baden-Baden (DE)

(73) Assignee: LuK Lamellen und Kupplungsbau Beteiligungs KG, Beuhl (DE)

( * ) Notice: Subject to any disclaimer, the term of this patent is extended or adjusted under 35 U.S.C. 154(b) by 0 days.

(21) Appl. No.: 12/215,067

(22) Filed: Jun. 24, 2008

(65) Prior Publication Data

US 2009/0054201 A1    Feb. 26, 2009

Related U.S. Application Data

(63) Continuation of application No. PCT/DE2006/002101, filed on Nov. 29, 2006.

(30) Foreign Application Priority Data

Dec. 24, 2005    (DE)    ........................ 10 2005 062 309

(51) Int. Cl.
    *B60W 10/08*    (2006.01)
(52) U.S. Cl. .......................................................... 477/5
(58) Field of Classification Search ........................ None
    See application file for complete search history.

(56) References Cited

U.S. PATENT DOCUMENTS

| | | | | |
|---|---|---|---|---|
| 6,102,144 A * | 8/2000 | Lutz | ......................... | 180/65.25 |
| 6,176,808 B1 * | 1/2001 | Brown et al. | .................... | 477/5 |
| 6,634,247 B2 * | 10/2003 | Pels et al. | ...................... | 74/329 |
| 7,292,917 B2 * | 11/2007 | Kuang et al. | ................... | 701/22 |
| 7,367,416 B2 | 5/2008 | Seufert et al. | | |
| 2003/0229429 A1 | 12/2003 | Zhang et al. | | |
| 2005/0101432 A1 * | 5/2005 | Pels et al. | ...................... | 477/5 |
| 2005/0261109 A1 | 11/2005 | Winkel et al. | | |
| 2006/0030979 A1 | 2/2006 | Kuang et al. | | |

FOREIGN PATENT DOCUMENTS

| | | |
|---|---|---|
| DE | 195 32 163 A1 | 3/1997 |
| DE | 197 21 298 A1 | 11/1998 |
| DE | 103 25 262 A1 | 12/2003 |
| DE | 102 44 026 A1 | 4/2004 |
| DE | 10 2005 034 794 A1 | 2/2006 |
| DE | 10 2004 062 012 A1 | 7/2006 |
| WO | WO 2004 037 593 | 5/2004 |

* cited by examiner

*Primary Examiner*—Dirk Wright
(74) *Attorney, Agent, or Firm*—Davidson, Davidson & Kappel LLC

(57) ABSTRACT

The invention relates to a method for reducing chatter in automotive drive train which comprises an internal combustion engine as the drive and a clutch device. According to the method, a rotating component of the drive train is driven by means of the internal combustion engine and the speed of the component is detected. Any chatter is also detected. When chatter occurs, an electric motor is used to transmit a torque onto the rotating component in order to actively dampen the chatter. The rotating component is driven by the electric motor for any chatter component at which the speed of the rotating component decreases and the rotating component is slowed down by the electric motor for any chatter component at which the speed of the rotating component increases.

2 Claims, 2 Drawing Sheets

AUTOMOTIVE DRIVE TRAIN AND METHOD FOR REDUCING CHATTER IN THE SAME

This is a continuation of prior International Application PCT/DE2006/002101, filed Nov. 29, 2006.

The invention relates to a method for reducing chatter in a motor vehicle power train that has a combustion engine as drive and a clutch device, wherein a rotating component of the power train is driven by means of the combustion engine and the speed of rotation of the component is detected, and wherein the presence of chatter is detected. The invention also relates to a motor vehicle power train that has a combustion engine as drive, a clutch device and a device for registering the speed of rotation of a rotating component of the power train, wherein the device for detecting the speed of rotation is connected to a control and/or regulating device.

BACKGROUND

Such a method and such a motor vehicle power train, in which chatter induced during the slippage phase of a clutch itself occurs in the power train, are known from DE 102 44 026 A1. The chatter is caused by a negative friction coefficient gradient of the clutch, which makes the damping in the power train negative. The vibrations are converted by the drive wheels of the motor vehicle into longitudinal vibrations, and are experienced as unpleasant by the vehicle occupants. To reduce the amplitude of the chatter, a transmission brake situated in the power train acts on a rotating component in the vehicle power train in such a way that the rotary motion of this component is continuously or periodically retarded. The transmission brake only makes a limited reduction of the chatter possible, however.

SUMMARY OF THE INVENTION

An object of the present invention provides a method and a device of the type named at the beginning, which makes effective attenuation of the chatter possible.

In accordance with an embodiment of the present invention, the invention provides that when chatter occurs, to actively damp the chatter a torque is transmitted to the rotating component by means of an electric motor in such a way that for a chatter component where the speed of the rotating component is decreasing the rotating component is driven by means of the electric motor, and for a chatter component where the speed of the rotating component is increasing the rotating component is retarded by means of the electric motor.

Thus the torque of the electric motor may be modulated so that the chatter is actively damped. The amplitude of the chatter oscillations may be effectively attenuated in both directions. This method can be used to reduce both chatter that is caused by negative friction coefficient gradients of the clutch and chatter that occurs due to geometric irregularities. In an advantageous manner, in addition to damping the chatter, the electric motor can also be used as a drive motor for the motor vehicle power train, in addition to and/or instead of the combustion engine. The combustion engine can then be dimensioned correspondingly smaller. Compared to a combustion engine without an electric motor, a hybrid drive of this sort may make a significant reduction in fuel consumption possible, since when coasting the combustion engine is uncoupled from the drive wheels of the motor vehicle power train, and the deceleration energy may be converted by means of the electric motor into electrical energy and may be temporarily stored for example in a rechargeable battery.

In an expedient embodiment of the invention, the rotating component may be an input shaft of a shift transmission, in particular a parallel shift transmission, where a rotation speed signal for the input shaft may be measured to detect the speed of rotation. The rotation speed signal is preferably measured inductively.

It is beneficial, when a control signal for the torque of the electric motor is provided, if a signal for a chatter component included in the rotational speed signal is preferably generated through high-pass filtering of the rotation speed signal, if a differential signal is formed from the control signal and the signal for the chatter component, and the torque of the electric motor is set depending on the differential signal. The chatter can then be attenuated even more effectively.

Here the torque of the electric motor is preferably set in proportion to the amplitude of the differential signal whereby using a parameterizable proportionality factor may be implemented.

In a preferred embodiment of the invention the mean acceleration of the rotating component is determined, with the control signal being chosen so that the acceleration of the electric motor conforms to the mean acceleration of the rotating component. That makes it unnecessary for the mass of the electric motor to be accelerated by the combustion engine.

A preferred design of the invention may include the motor vehicle power train having a combustion engine, an electric motor, a clutch device and a parallel shift transmission with a drive part and a first and a second input shaft and that the clutch device has a first clutch to connect the drive part to the first input shaft and a second clutch to connect the drive part to the second input shaft, comprising the following steps:

the clutches are brought to a disengaged position in which the first input shaft and the second input shaft are separated from the drive part, for a drive-off procedure, the parallel shift transmission is set so that the first input shaft 17a has a drive connection with an output shaft 22 of the parallel shift transmission by way of a first gear, and the second transmission shaft 17b is connected by way of a second gear, the first clutch K1 is engaged at least far enough so that it can transmit a torque, the system detects whether chatter is present, if chatter is present, the electric motor 11 is used to transmit a torque to the second input shaft 17b in such a way that with a chatter component where the speed of the second input shaft 17b is decreasing, the shaft is driven by means of the electric motor 1, and with a chatter component where the speed of the second input shaft 17b is increasing, the shaft is retarded by means of the electric motor 11, the procedure continues with step d).

During the drive-off procedure the electric motor may thus be connected by way of the second gear and the second transmission shaft to the output shaft of the parallel shift transmission, so that the electric motor can introduce a torque into the output shaft of the parallel shift transmission whose pattern may be chosen so that the chatter may be actively attenuated.

In a preferred embodiment of the invention, after steps c), d) and/or e) the system checks whether the drive-off process has ended, and steps d), e) and/or f) are carried out only if the drive-off process has not ended. Thus the compensation for chatter may be blocked outside of the drive-off process, in order to avoid unnecessary actuation of the electric motor.

In regard to the motor vehicle power train, the problem named earlier may be solved by the motor vehicle power train having an electric motor as auxiliary drive, which is connected to the control and/or regulating device through an actuating device, and by the control and/or regulating device being designed so that with a chatter component where the speed of rotation is decreasing the rotating component may be driven by means of the electric motor, and with a chatter component where the speed of rotation of the rotating component is increasing, the rotating component may be retarded by means of the electric motor.

By means of the electric motor, chatter that occurs at the clutch device can be reduced actively by overlaying a torque that is modulated contrary to the chatter. The hybrid drive made from the combustion engine and the electric motor may also enable fuel-saving operations of the motor vehicle power train.

BRIEF DESCRIPTION OF THE DRAWINGS

An exemplary embodiment of the invention will be explained in greater detail below on the basis of the drawing. The figures show the following.

DETAILED DESCRIPTION

Figure 1:
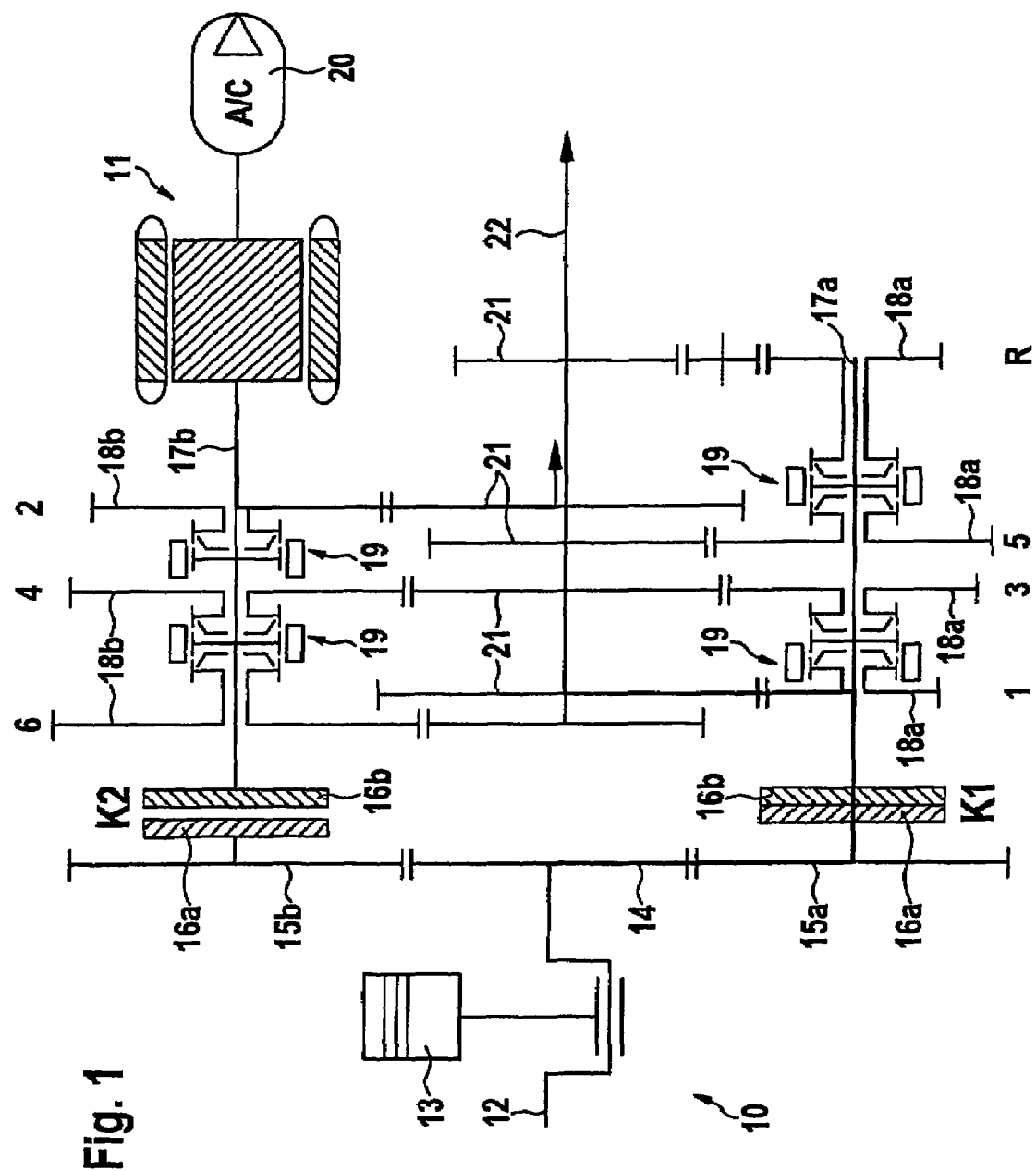
FIG. 1: a schematic partial depiction of a motor vehicle power train having a parallel shift transmission, wherein a first clutch is engaged and a second clutch is disengaged.
Figure 2:
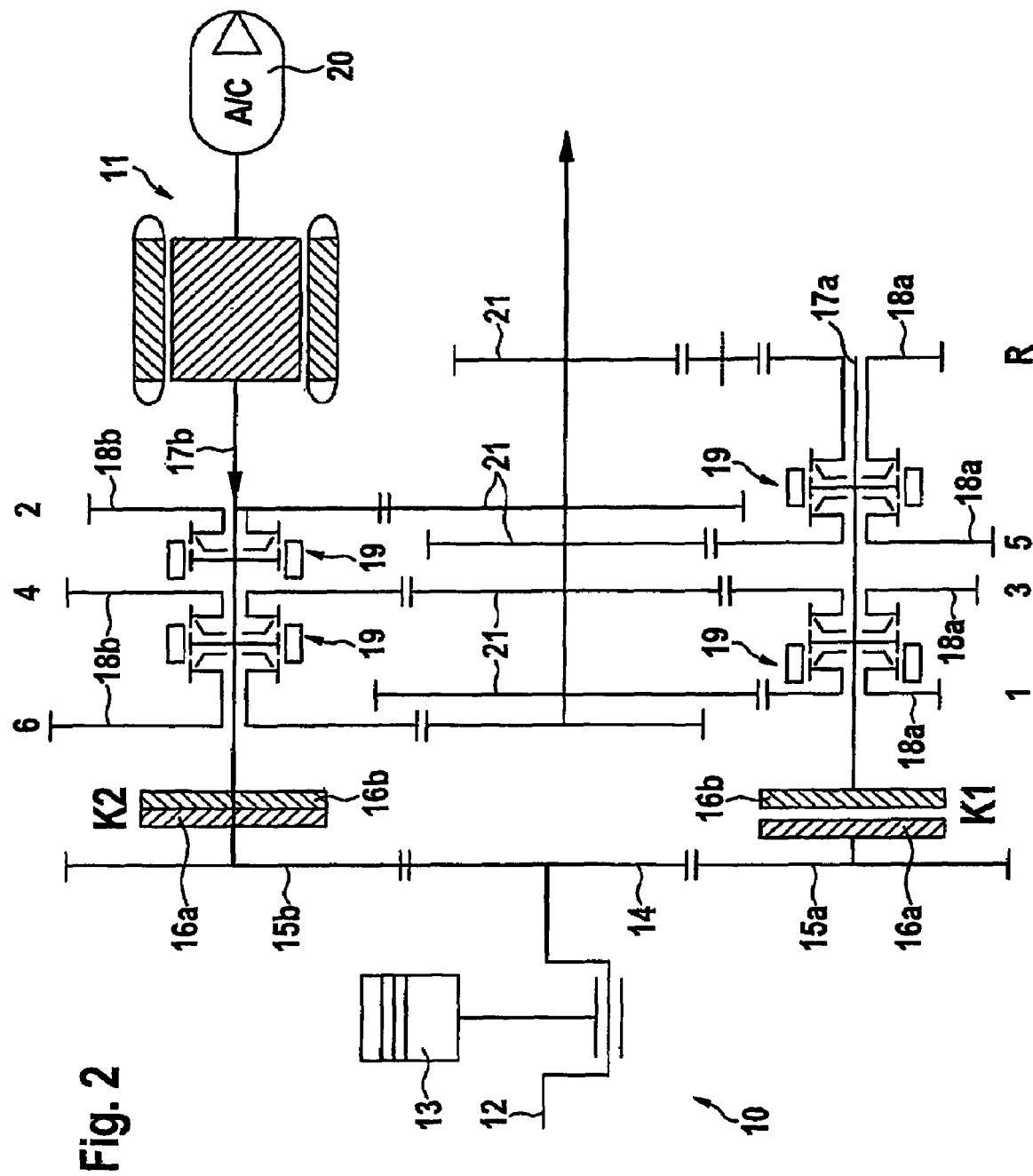
FIG. 2: a depiction similar to FIG. 1, but wherein the first clutch is disengaged and the second clutch is engaged.

A motor vehicle power train shown schematically in FIGS. 1 and 2 has a hybrid drive with a combustion engine 10 in the form of a reciprocating piston engine and an electric motor 11 designed as a starter generator as its drive. The combustion engine 10 has a crankshaft 12 on which reciprocating pistons 13 are mounted through connecting rods; the reciprocating pistons are situated so that they can move away from and toward the crankshaft 12 in cylinders of an engine block in a known manner. On the engine block a cylinder head is provided, which has intake and outlet valves that are actuatable by means of a control device which is not shown in further detail in the drawing. The reciprocating pistons 13, the cylinder head and the intake and outlet valves delimit combustion chambers, in which a fuel-air mixture can be ignited.

The crankshaft 12 is drive-connected with a flywheel 14, which has a ring gear that meshes with two gear wheels 15a, 15b that are situated at the circumference of the ring gear and offset from each other. Each of these drives a clutch plate 16a. A first clutch plate 16a of a first clutch K1 is situated axially relative to a first gear wheel 15a, and a first clutch plate 16a of a second clutch K2 is situated axially relative to a second gear wheel 15b. Assigned to each first clutch plate 16a is a second clutch plate 16b. The respective first and second clutch plates 16a, 16b that are assigned to each other can be brought into a disengaged and an engaged position. In the disengaged position the first and second clutch plates 16a, 16b are at a distance from each other axially, and in the engaged position the clutch plates 16a, 16b are in contact with each other and frictionally engaged.

The second clutch plate 16b of the first clutch K1 is drive-connected with a first transmission input shaft 17a, and the second clutch plate 16b of the second clutch K2 is drive-connected with a second transmission input shaft 17b of a parallel shift transmission. Situated on the transmission input shafts 17a, 17b are first transmission gears 18a, 18b, which can be connected by means of a shifting apparatus (not shown in further detail in the drawing) in a rotationally fixed connection to the transmission input shaft 17a, 17b assigned to them, to change the transmission ratio. Synchronizer rings 19 are provided to synchronize the first transmission gears 18a, 18b with the respective transmission input shafts 17a, 17b assigned to them. The first transmission gears 18a situated on the first transmission input shaft 17a are assigned to reverse gear R and to forward gears 1, 3 and 5, and the first transmission gears 18b situated on the second transmission input shaft 17b are assigned to forward gears 2, 4 and 6.

The second input shaft 17b is drive-connected with the rotor of an electric motor 11, the stator of which is connected to the motor block in a rotationally fixed connection. A winding of the electric motor 11 is connected to a rechargeable battery through an actuating device 20.

The first transmission gear wheels 18a, 18b mesh with second transmission gear wheels 21, which are situated on an output shaft 22 of the parallel shift transmission and are rigidly connected to that shaft. The output shaft 22 is drive-connected through a differential to drive wheels (not shown in further detail in the drawing) of the power train. The first transmission gear wheels 18a, 18b and the second transmission gear wheels 21 have different diameters.

To start the combustion engine 10, the first transmission gear wheels 18b situated on the second input shaft 17b are disengaged from the input shaft 17b. If the first transmission gear wheels 18b are already disengaged from the second input shaft 17b, this step can be omitted.

In addition, the first clutch K1 is brought to the disengaged position and the second clutch K2 to the engaged position. If the clutches K1, K2 are already in the indicated position, this step can be omitted. Alternatively, the first clutch K1 can be brought to the engaged position and the first transmission gear wheels 18a disengaged from the first input shaft 17a.

Then the combustion engine 10 will be driven by means of the electric motor 11 in order to start it. As that occurs, the electric motor 11 transmits a drive torque to the second drive shaft, which is transmitted through the second clutch K2 to the crankshaft 12.

With first clutch K1 disengaged, the parallel shift transmission is set so that the first transmission shaft 17a is drive-connected through the first gear with the output shaft 22 of the parallel shift transmission. Furthermore, with second clutch K2 disengaged, the parallel shift transmission is set so that the second transmission shaft 17b is connected through the second gear with the output shaft 22.

Then the first clutch K1 is slowly engaged to start the motor vehicle in motion, so that the combustion engine 10 transmits a drive torque to the drive wheels through first clutch K1, first input shaft 17a, a first transmission gear wheel 18a, a second transmission gear wheel 21 and output shaft 22. Clutch K2 continues to be disengaged (see FIG. 1).

At the same time, the system detects whether chatter is present. To that end, for example, a rotational speed signal $N_{Ge}$ for the first input shaft 17a can be measured, and any vibrating component that may be present can be filtered out of the rotational speed signal $N_{Ge}$ and then compared with a limit.

If chatter is present, the electric motor 11 is used to transmit a torque to the second input shaft 17b and from there through the second gear to the output shaft 22 in such a way that with a chatter component where the speed of the first input shaft 17a is decreasing, the shaft is driven by means of the electric motor 11, and with a chatter component where the speed of the first input shaft 17a is increasing, the shaft is retarded by means of the electric motor 11. To that end, a control signal $M_{control}$ is provided for the torque $M_{e\text{-}machine}$ of the electric motor 11, and a signal is produced for a chatter component included in the rotational speed signal $N_{Ge}$ by filtering the rotational speed signal $N_{Ge}$. The control signal $M_{control}$ is chosen so that the acceleration of the electric motor 11 conforms to the mean acceleration of the second input shaft 17b. That makes it unnecessary for the mass of the electric motor 11 to be accelerated by the combustion engine 10. A differential signal is formed from the control signal and the signal for the chatter component, and the torque of the electric motor 11 is set depending on the differential signal:

$$M_{e\text{-}machine} = M_{control} - k*(N_{Ge} - N_{G\text{-}filt})$$

$N_{Ge\text{-}filt}$ is produced here by low-pass filtering the rotational speed signal $N_{Ge}$. The value k stands for a proportionality factor. The corresponding torque is transmitted through the second gear to the output shaft 22, and from there through the first gear to the first input shaft 17a.

A check is then performed to determine whether the drive-off process has ended. The velocity of the vehicle can be measured to that end and compared to a limit. Instead of the velocity, however, the rotational speed of the first input shaft can also be measured and compared to the limit.

If the drive-off process has not yet ended, the system checks whether the chatter has subsided. To that end, the vibrating component of the rotational speed signal is newly determined and compared to the limit. If the chatter has not subsided, it continues to be damped by means of the electric motor 11, while the procedural steps described above are run through again.

If no chatter is present, the system checks whether the drive-off process has ended. If not, the system again checks whether chatter is present, in order to compensate for it by means of the electric motor 11 if necessary. The system just described can be employed accordingly when starting out in reverse gear R.

As can be seen from FIG. 2, it is also possible to start out in second gear. With second clutch K2 disengaged, the parallel shift transmission is set so that the second transmission shaft 17b is drive-connected through the second gear with the output shaft 22 of the parallel shift transmission. Furthermore, the first clutch K1 is disengaged and/or the first gear wheels are disengaged from the first transmission shaft 17a.

Then the second clutch K2 is slowly engaged to start the motor vehicle in motion, so that the combustion engine 10 transmits a drive torque to the drive wheels through second clutch K2, second input shaft 17b, transmission gear wheel 18b for the second gear, a second transmission gear wheel 21 and output shaft 22. Clutch K1 continues to be disengaged (see FIG. 2).

Now the system detects whether chatter is present. To that end a rotational speed signal for the second input shaft 17b is measured, and any chatter component present is filtered out of the rotational speed signal and then compared to a limit.

If chatter is present, the electric motor 11 is used to transmit a torque to the second input shaft 17b and from there through the second gear to the output shaft 22 in such a way that with a chatter component where the speed of the second input shaft 17b is decreasing, the shaft is driven by means of the electric motor 11, and with a chatter component where the speed of the second input shaft 17b is increasing, the shaft is retarded by means of the electric motor 11. The torque $M_{e\text{-}machine}$ of the electric motor 11 is determined according to the equation stated above from the control signal $M_{control}$, the rotational speed signal $N_{Ge}$ for the second input shaft 17b and the proportionality factor k. Otherwise the procedural steps set forth for FIG. 1 are utilized accordingly.

It should also be mentioned that the electric motor 11 can also be situated axially relative to the crankshaft 12.

REFERENCE LABELS 10 combustion engine
11 electric motor
12 crankshaft
13 reciprocating piston
14 flywheel
15a first gear wheel
15b second gear wheel
16a first clutch plate
16b second clutch plate
17a first input shaft
17b second input shaft
18a first transmission gear wheel
18b first transmission gear wheel
19 synchronizer ring
20 actuating device
21 second transmission gear wheel
22 output shaft
K1 first clutch
K2 second clutch

What is claimed is:

1. A method for reducing chatter in a motor vehicle power train that has a combustion engine as a drive and has a clutch device, wherein a rotating components of the power train is driven by the combustion engine and a speed of rotation of the rotating component is detected, and wherein the presence of chatter is detected, the method comprising, when chatter occurs:

actively damping the chatter for a chatter component by transmitting a torque to the rotating component via an electric motor, so that, when the speed of the rotating component is decreasing, the rotating component is driven by the electric motor, and, when the speed of the rotating component is increasing, the rotating component is retarded by the electric motor, wherein the rotating component is an input shaft of a shift transmission, and further comprising measuring a rotational speed signal for the first or second input shaft to detect the speed of rotation, wherein the motor vehicle power train has the combustion engine, the electric motor, the clutch device and a parallel shift transmission with a drive part and a first input shaft as well as a second input shaft, and the clutch device has a first clutch to connect a drive part to the first input shaft and a second clutch to connect a drive part to the second input shaft, the method including:

a) disengaging the first and second clutches to a disengaged position in which the first input shaft and the second input shaft are separated from the drive part, b) for a drive-off procedure, setting the parallel shift transmission so that the first input shaft has a drive connection with an output shaft of the parallel shift transmission by way of a first gear, and the second input shaft is connected by way of a second gear, c) engaging the first clutch at least far enough so that the first clutch can transmit a torque, d) detecting whether chatter is present, e) if chatter is present, transmitting a torque to the second input shaft by the electric motor-in such a way that with the chatter component where the speed of the second input shaft is decreasing, the shaft is driven by the electric motor, and with the chatter component where the speed of the second input shaft is increasing, the shaft is retarded by the electric motor, f) continuing the procedure with step d).

2. The method as recited in claim 1 wherein after steps c), d) and/or e) checking whether a drive-off process has ended, and steps d), e) and/or f) are carried out only if the drive-off process has not ended.

* * * * *